Dec. 20, 1927.  
R. E. OLSEN  
AUTOMATIC PHOTOGRAPHIC MACHINE  
Filed July 2, 1925

INVENTOR.
R. E. OLSEN
BY
ATTORNEY

Dec. 20, 1927.  
R. E. OLSEN  
1,653,408  
AUTOMATIC PHOTOGRAPHIC MACHINE  
Filed July 2, 1925  
3 Sheets-Sheet 2

INVENTOR.  
R. E. OLSEN  
ATTORNEY.

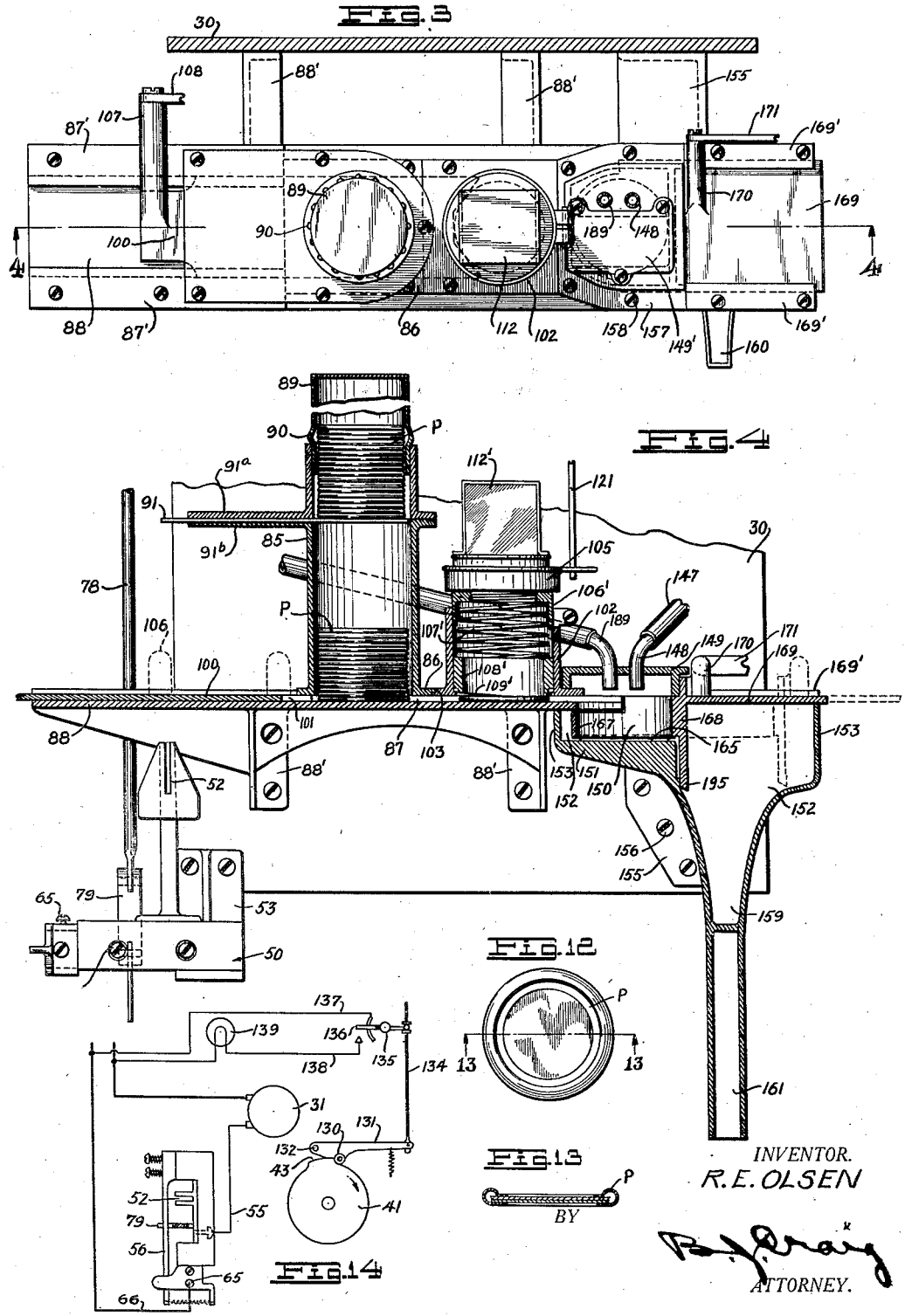

Patented Dec. 20, 1927.

1,653,408

UNITED STATES PATENT OFFICE.

ROBERT E. OLSEN, OF OCEANPARK, CALIFORNIA, ASSIGNOR, BY DIRECT AND MESNE ASSIGNMENTS, TO NESLO HOLDING COMPANY, INC., A CORPORATION OF NEW YORK.

AUTOMATIC PHOTOGRAPHIC MACHINE.

Application filed July 2, 1925. Serial No. 41,033.

This invention relates to an automatic photographic device.

The general object of the invention is to provide an improved photographic device wherein the parts are automatically actuated and wherein improved means is provided for handling the photograph.

One of the specific objects of the invention is to provide an automatic mechanism for taking and developing photographs wherein stations are provided for taking the picture, for developing it and for delivering it and wherein the photographic plate will maintain a position in one plane while passing from one station to another.

Another object of the invention is to provide a photographic machine wherein photographs may be automatically taken upon small plaques and wherein the plaques remain horizontal during the photographing and developing operations.

A further object of the invention is to provide novel means for excluding light from the exposing chamber of a photographic machine.

A further object of the invention is to provide an improved means for operating the various parts of an automatic photographic machine.

Another object of the invention is to provide an improved picture taking mechanism for use with automatic photographic machines.

Another object of the invention is to provide an improved control mechanism for controlling the moving parts of an automatic photographic machine.

An additional object of the invention is to provide an improved means for developing and washing a photograph in an automatic photographic machine.

Another object of the invention is to provide a novel means for excluding light from the developing chamber of an automatic photographic machine.

A further object of the invention is to provide an improved receptacle for plates in an automatic photographic machine.

Other objects of the invention will be apparent from the following description taken in connection with the accompanying drawings wherein Fig. 1 is a perspective view of a photographic machine embodying the features of my invention;

Fig. 3 is a top plan view of the plate slide showing the actuating mechanism;

Fig. 4 is a sectional view taken on line 4—4, Fig. 3;

Fig. 5 is a sectional view partly in elevation, showing the coin actuated mechanism;

Fig. 6 is a plan view of the coin actuated circuit closer;

Fig. 7 is a sectional view on line 7—7, Fig. 6;

Fig. 8 is an end view of the circuit closing mechanism;

Fig. 9 is an elevation showing the back of the rotating member;

Fig. 11 is a diagrammatic view showing the lens and prism arrangement;

Fig. 12 is plan of sensitized plate;

Fig. 13 is a section on line 13—13 Fig. 12;

Fig. 14 is a wiring diagram and

Fig. 15 is a transverse section of the delivery device.

Figure 1:
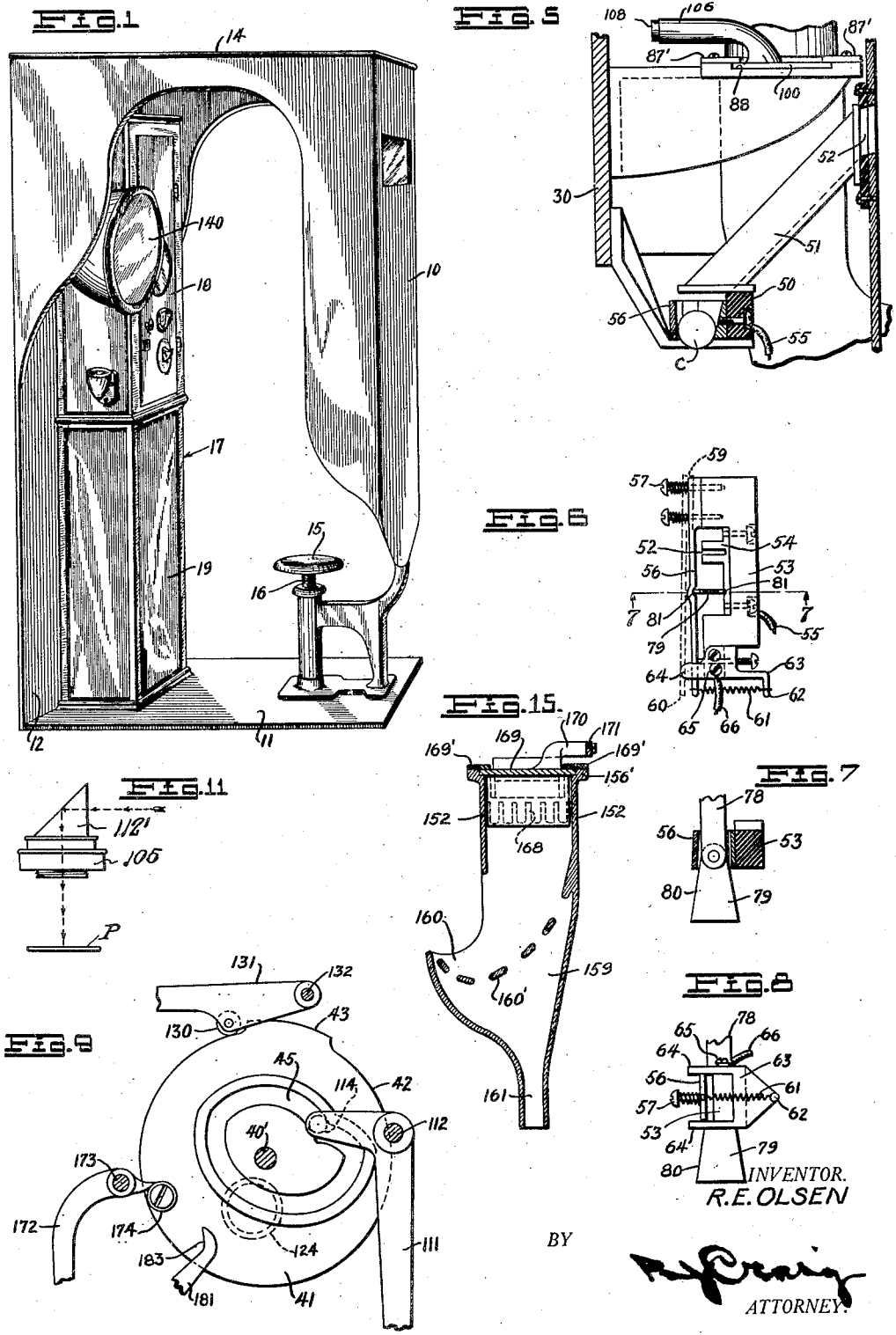

Referring to the drawing by reference characters I have shown one embodiment of my invention at 10. As shown here the device includes a base 11 having a back 12 and a top 14 thereon.

Upon the base 11 I arrange a stool 15 which is provided with a threaded support 16 so that it may be raised or lowered as desired to suit persons of different stature. Mounted upon the back 12 I show the case of my photographic machine at 17. This case as shown comprises an upper cover portion 18 for the operating mechanism and a lower cover portion 19 in which a receptacle for the waste liquids may be provided.

The photograph making and developing machine is shown as mounted on plate 30 which is adapted to be secured in the upper portion of the case 17.

Mounted upon the plate 30 is a motor 31 which is provided with a governor 32. Arranged upon the armature shaft of the motor is a worm 33 which is shown as engaging a worm wheel 34. The worm wheel 34 has a pinion 35 thereon which drives a gear 36 the shaft of which is provided with a pinion 37 which in turn drives a gear 38. The gear 38 is in mesh with a gear 39 mounted on a shaft 40. Secured upon this shaft 40 by means of a screw 40' is a rotatable member 41, the periphery 42 of which forms a cam being circular with respect to the axis of the shaft 40 except at the cam portion 43 where the periphery is of larger radius for a purpose to be presently described. One face of the member 41 is provided with a cam groove 45 (see Fig. 9) the purpose of which will be later described.

The plate 30 has a switch member 50 mounted thereon. Upon this switch member a coin chute 51 having a coin slot 52 is arranged. The switch member 50 includes a body portion 53 which is made of insulating material. Upon this body portion a member 54 is secured. The lower part of the coin slot 52 is arranged in this member 54 which is made of material which is a good conductor of electricity. The member 54 is connected to a lead 55 which in turn is connected to the motor 31. Arranged on the body 53 is a circuit closing member 56 which is held in place by a pair of screws 57 secured to the body 53. The screws 57 enable the member 56 to be adjusted and this member is normally so positioned that a coin C dropped in the slot 52 will engage the member 56 as shown in Fig. 5 and will thus be prevented from passing beyond the end of the coin slot. To allow lateral movement of the member 56 on the screws 57 springs shown at 59 are provided.

The free end 60 of the member 56 engages a spring 61 which is secured at 62 to a guide member 63 which is fastened on the body 53. The guide member 63 includes spaced arms 64 between which the member 56 moves.

From the foregoing description it will be apparent that when a coin is inserted in the coin slot 52 it will pass down the chute 51 and will engage the member 56. The member 56 is a conductor of electricity and engages the arms 64 of the member 63 which is also a conductor of electricity. This member 63 has a binding post 65 thereon, from which a lead 66 extends to the motor 31. It will thus be apparent that when a coin is inserted in the coin slot the circuit will be completed to the motor.

When the motor starts it will drive through the chain of gears 33, 34, etc., to the shaft 40 and will cause the rotatable member 41 to rotate. Upon the face of this member opposite to that on which the cam 45 is provided, I arrange a cam 70 which is adjustably mounted by fastening members 71 which work in slots in the body of this cam.

A bell crank lever 72 is pivoted at 73 on the plate 30. This bell crank 72 is provided at one end with a lip 74 which engages the operating face of the cam 70. When the motor operates the cam 70 will rock the lever 60 and will depress the end 76 of this lever. This lever is provided with a spring 75 one end of which is secured to the plate 30. This spring tends normally to raise the lever so that as soon as the lip 74 clears the cam 70 the spring 75 will raise the end 76 of the lever 72 and will hold this end raised until the plate has made a complete revolution at which time the cam 70 will engage the lip 74 and will raise it to its initial position.

The end 76 of the lever 72 is provided with a link 78 which has a circuit closer 79 thereon which is normally disposed below the two spaced members 54 and 56. This circuit closer 79 has flaring edges 80 which fit in notches 81 in the members 53 and 56 and as the spring 75 lifts the end 76 of the bell crank 72, these edges 80 slide along the notches and as this member 80 is a conductor of electricity the circuit to the motor 31 will remain closed through the member 80. This same operation will cause a slight lateral movement of the member 56 so that the coin in the slot 52 will be released and will pass to a coin box in the case 17.

From the foregoing description it will be apparent that the insertion of a coin in the slot 52 will start the motor operating through the current which passes through the coin and the leads 55 and 66 and that as soon as the motor has started, the circuit will remain closed due to the circuit closer 79, and that the circuit will remain closed until the member 41 has made a complete revolution.

A receptacle for sensitized plates P is shown at 85. This receptacle has a base flange 86 which is supported on the upstanding sides of a grooved slideway 88. This slideway 88 is formed by cutting a groove in a strip of metal which is supported on the plate 30 by brackets 88'. Rails 87 are secured to the slideway at one end of the flange 86. The groove in the slideway is of sufficient thickness so that the plates D may pass beneath the flange 86 along the upper surface of the slideway.

The receptacle 85 has a telescoping closure cap 89 thereon which is provided with indentations 90 to hold it in proper position. The receptacle has a sliding closure 91 thereon which is disposed below the top of the receptacle between two flanges 91$^a$ and 91$^b$. This sliding closure has a light tight engagement with the side walls of the receptacle.

To recharge the receptacle with plates the closure 91 is moved to closed position and the closure cap 89 is removed. A plurality of plates are placed in the cap 89 and it is placed upon the receptacle 85. This will allow the plates in the cap 89 to fall upon the closure 91. The closure 91 is then moved to open position allowing the plates to fall to position in the receptacle 85, after which the closure 91 is moved to closed position.

The receptacle 85 is shown as provided with a ruby transparent panel 92 so that the plates within the receptacle can be seen.

Mounted between the rails 87 is a slide 100. The forward part of this slide is notched as at 101 to engage the lowermost plate D in the receptacle 85 so that it may advance this plate from beneath the receptacle to a position beneath a lens tube 102. The slide 100 is movable beneath the rails 87′ and the flange 86.

The slide 100 is provided with a lug 106 from which an arm 107 projects. This arm 107 has a link 108 thereon which is connected by a turnbuckle 109 with a link 110 which is connected to a bell crank lever 111 pivoted at 112 to the plate 30. The end 113 of the bell crank lever 111 is provided with a cam roller 114 which engages the cam groove 45 previously described.

Figures 2, 10:
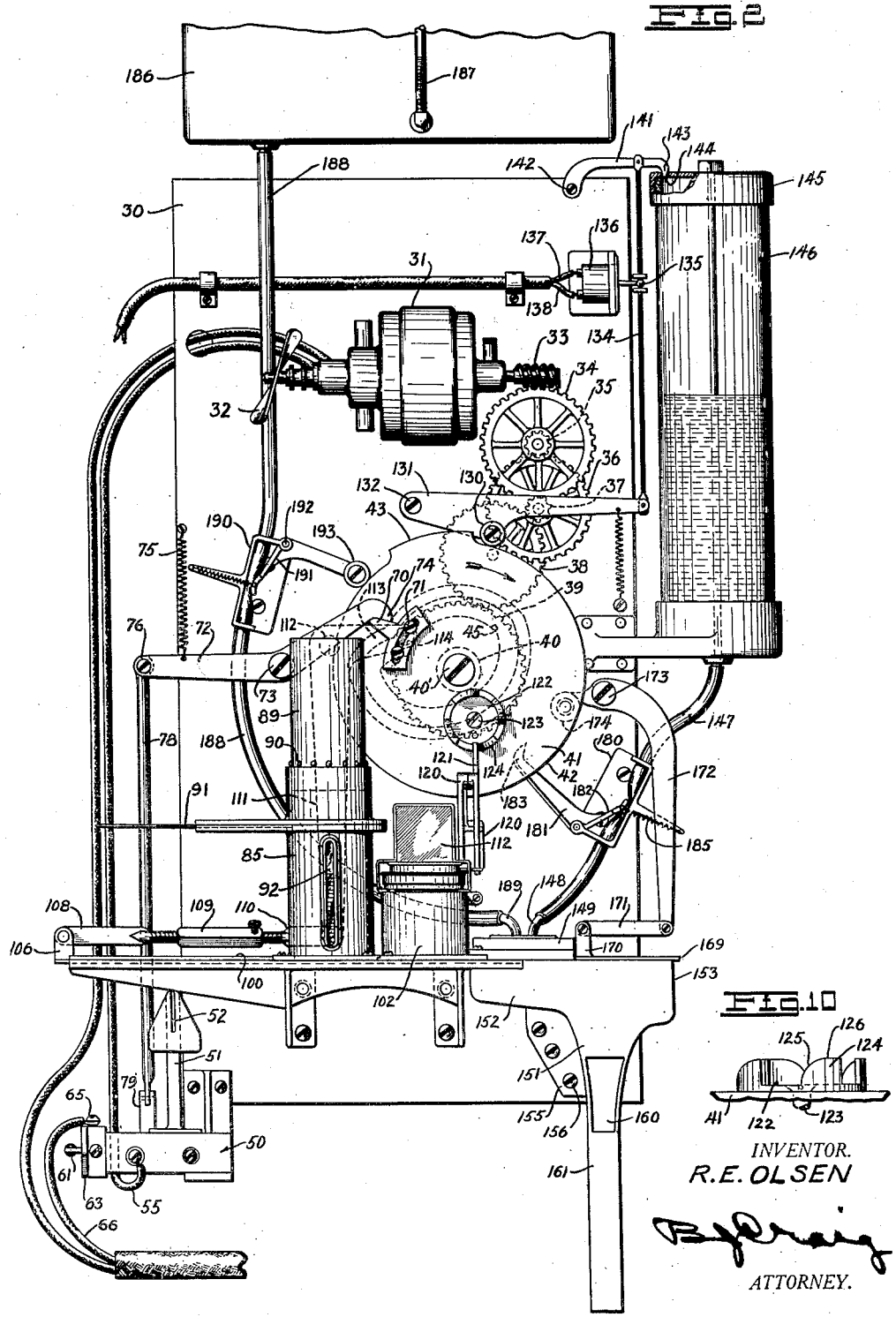
Fig. 2 is a front elevation of a part of the machine showing the operating parts.
Fig. 10 is a side elevation showing the shutter operating cam.

The cam groove is so timed that when the cam 70 engages the lip 74 as shown in Fig. 2 the slide 100 will be advanced to the position wherein one of the plates P will be beneath the lens tube 102. As soon as the exposure is made the cam will rock the lever 111 causing it to move the slide 100 and advance the plate to a developing station, to be later described.

While the plate is being developed the cam will cause the slide to reverse its direction of movement so that it will pass to the position shown in Fig. 4, thereby allowing another plate to drop upon the slideway. The cam will then cause the slide to reverse its movement and will advance the lowermost plate on the slideway to a position beneath the lens tube 102, after which the roller will merely rotate idly in the cam groove while the picture is being completed.

The lens tube 102 has a rabbeted flange 103 thereon which fits beneath a rabbet on the flange 86 so that light will be excluded. The flange 103 is spaced above the slideway so that plates can pass thereunder. Mounted within the lens tube 102 is a cap 105 which has an internal flange 106′. This flange engages a spring 107′ the lower end of which engages a sliding annular collar 108′ the lower front portion 109′ of which is beveled and the rear portion of which is plane to engage the upper periphery of a plate as shown in Fig. 4 to prevent the entry of light.

From the foregoing description it will be apparent that as the slide 100 advances a plate from the receptacle beveled edge 109′ of the collar 108′ will be engaged by the plate and will be raised. The tension of the collar 108 on the plate will also serve to hold it in position while the plate is being exposed.

The lens which is mounted within the lens tube 102 may be of any suitable character. Inasmuch as the plates are held horizontal and the lens tube has its axis vertically arranged it is necessary to direct the light rays into the lens tube. To do this I mount a prism 112 above the lens tube and this prism is so arranged that the horizontal light rays will be directed into the lens tube 102.

Associated with the lens tube is a shutter mechanism 120. I may use any desired type of shutter mechanism and that shown is merely diagrammatic and is for the purpose of illustration only. The shutter mechanism includes an operating lever 121 which when rocked will open the shutter and which when released will close the shutter.

To actuate the lever 121 I arrange upon the rotating member 41 a disc 122 which has a removable securing member 123 thereon whereby the disc can be turned. The periphery of the disc is provided with a plurality of cam members 124 which include inclined portions 125 for engaging the lever 121 and rocking it, and flat topped portions 126 for holding the lever rocked. The length of the top portions 126 on the different members 124 varies so that by turning the disc 122 the time of exposure may be varied.

The disc 122 is so arranged on the rotatable member 41 that the cam 124 will engage the lever 121 and make the exposure a short interval after the cam member 70 begins to rock the cam 72 and just prior to the time the cam 45 moves the slide 100 to the right in Fig. 4 to advance the plate to the developing station.

The cam portion 43 of the disc 41 is adapted to engage the roller 130 which is mounted on an arm 131 which is pivoted at 132 to the plate 30. The free end of this arm is connected to a rod 134 which engages the lever 135 of a snap switch 136 which is adapted to close the circuit through leads 137 and 138 to an illuminating lamp 139 which is mounted in a lamp case 140.

The rod 134 is also connected to a lever 141 pivoted at 142 to the plate 30. The outer end of this lever is provided with a closure member 143 which is adapted to fit a vent opening 144 in a cap 145 which is mounted on a transparent developer holding tank 146. The flange on the cap 145 is sufficiently short so that when the rod 134 is raised the cap can be removed.

The lower end of the developer fluid tank 146 is connected by a flexible tube 147 with a pipe 148 which is fixed in a cap 149 and which serves as a closure for the developing chamber 150. This chamber comprises a body part 151 having upstanding sides 152 and ends 153. The body 151 is secured to the plate 30 by means of a bracket 155 which is held in place by screws 156. The cap 149 has a removable closure 149' thereon.

The top of the sides 152 of the body part 151 has a rabbeted flange 156' thereon on which an apertured plate 157 is secured by screws 158. The plate 157 abuts against the flange 103 previously described. The body 151 is provided with a funnel shaped lower portion 159 which terminates in an offset portion 160 where the completed pictures are delivered on transverse slots 160', and in a spout portion 161 through which the waste liquids, used in finishing the picture, are delivered.

The body 151 is provided with a shelf 165 which is shown as horizontal and which is preferably parallel to the plane top of the slideway 88. The shelf 165 forms the bottom of the developing chamber 150, the ends of which are formed by the sides 152 of the body 151. The sides of the chamber are formed by cross members 167 and 168 arranged on a delivery member 169 which is mounted to slide upon the rabbets in the flanges 156'. Cleats 169' serve to hold the delivery member in place.

The delivery member 169 is provided with a boss 170 which is connected by means of a link 171 with a bell crank 172 pivoted at 173 on the plate 30 and which is adapted to engage a roller 174 mounted on the rotatable member 41 and so positioned that it will rock the bell crank 172 after the picture is developed and washed and just prior to the time the machine comes to rest.

In order to control the flow of developing fluid from the tank 146 I show a tube compressor comprising a body 180 which is mounted on the plate 30 and which includes a pivoted bell crank 181 having a flat arm 182 for engaging the tube 147 and having an end 183 which is adapted to be engaged by the roller 174 on the rotatable disc 41. The engagement of the end 183 of the bell crank 181 (by the roller 174) will rock the bell crank against the tension of a spring 185, which normally tends to hold the flat end 182 against the tube to close communication through the tube.

This last mentioned operation will take place just after the plate has been delivered to the developing station, and as the plate is at rest for some time ample opportunity will be given for developing the plate.

In order to supply water for washing the developing solution from the plate I show a tank 186 which has a gauge glass 187 therein and which is connected by a flexible hose 188 with a pipe 189 secured in the cap 149 which is fitted over the developing chamber.

A tube compressor 190 which is similar to the compressor 180 previously described has a spring pressed closure member 191 thereon which is pivoted at 192 to the plate 30 and which has a cam roller 193 thereon which is adapted to engage the cam surface 43 previously described. The closure member 191 will be operated to cause washing of the developed picture just prior to the time the picture is advanced by the delivery member 169.

The cross member 168 is extended as at 195 to form a wing which extends into the funnel portion 159 previously described and engages the body 151 adjacent its lower end to provide a light tight closure. The member 168 may have a serrated lower end if desired.

Having thus described my invention, I claim:

1. In a device of the class described, a receptacle for plates, a horizontal conveyor adjacent said receptacle, means to remove plates singly from said receptacle, a lens, said moving means acting to move said plates in a horizontal plane to said lens, means to expose said plates, means to convey said plates from said lens horizontally to a developing station, means to develop said plate and means to deliver plates from the machine.

2. In a photographic apparatus, the combination of a receptacle for holding sensitized plates in a horizontal position, a lens tube, a slide for conveying a single plate from said receptacle to position beneath the tube, means for exposing said plate, a developing and washing station, means to move said plate to the said station, a discharge chute, and means to convey the plate to the chute.

3. In a photographic apparatus, the combination of a receptacle for sensitized plates, a lens, a slide for conveying a plate from said receptacle to said lens, means for operating the slide, means for exposing said plate, a developing and washing station, means whereby said slide moves said plate to the said station, a second slide, a discharge chute and means whereby said second slide moves said plate from the developing station to said chute, said slides operating in parallel horizontal planes.

4. In a photographing apparatus, the combination of a receptacle for holding a supply of plates stacked one upon another, a lens tube adjacent to said receptacle, said tube being vertically arranged, a slide movable beneath said receptacle and adapted to engage the lowermost plate and to convey it to a position adjacent to said lens, a developing station, and means for moving said plate from adjacent said lens to said station, said means including said slide.

5. In a photograph machine, the combination with a bath, of a receptacle for plates, horizontally reciprocating means for moving a plate from the receptacle into the bath, a delivery chute, and other reciprocating means for moving a plate from the bath to the delivery chute.

6. In a photographic apparatus, the combination with a lens tube, a plate magazine, a movable slide adapted to transport a plate from the magazine, a movable plate holder normally supporting a plate in a position opposite the lens tube, a developing station and a plate ejector, of operating means for moving the plate horizontally during its entire movement and effecting the following operations, to wit: first, the movement of the slide to present an unexposed plate to the tube, next, the movement of the plate away from the tube to the developing station; and finally the movement of the ejector to eject the plate.

7. In an automatic photographic mechanism, a supporting base, a receptacle for sensitized plates, a vertically arranged lens tube, a prism associated with said lens tube for directing horizontal light rays into said tube, means to move a plate to horizontal position beneath said lens tube, a shutter for controlling passage of light to said lens tube, means to control said shutter, a developing station including a receptacle having a movable side wall, means to move a plate from beneath said lens tube to the developing station, and means to deliver the plate from the developing station, said last mentioned means including the movable side wall of the receptacle.

8. In an automatic photographic mechanism, a supporting base, a receptacle for sensitized plates, a vertically arranged lens tube, a prism associated with said lens tube for directing horizontal light rays into said tube, means for engaging a plate to move it horizontally to position adjacent to said lens tube, a shutter for controlling passage of light to said lens tube, means for controlling said shutter, a developing station including a receptacle, means to move a plate to the developing station, and means to deliver the plate from the developing station.

9. In an automatic photographic mechanism, a supporting base, a receptacle for sensitized plates, a conveyor movable adjacent to said receptacle, a lens, means on said conveyor for engaging a plate to move it to position adjacent to said lens, a shutter for controlling passage of light to said lens, a developing station including a receptacle, means to convey a plate to the developing station, a delivery chute, means to deliver the plate from the developing station to the delivery chute, said last mentioned means including a member surrounding said plate and means for moving said member.

10. In an automatic photographic mechanism, a supporting base, a receptacle for sensitized plates, a conveyor, movable beneath said receptacle, a lens, means on said conveyor for engaging a plate to move it to position adjacent to said lens, a shutter for controlling passage of light to said lens, a developing station including a receptacle, means to convey a plate to the developing station, means to remove the plate from the developing receptacle, said last mentioned means including a slide, said slide having a wing thereon, said wing being adapted to engage a portion of the wall of the developing receptacle with a light tight fit.

11. In an automatic photographic mechanism, a supporting base, a receptacle for sensitized plates, a conveyor movable beneath said receptacle, a lens, means on said conveyor for engaging a plate to move it to position adjacent to said lens, a shutter for controlling passage of light to said lens, a collar mounted adjacent to said lens, said collar having a portion thereon for engaging the plate to prevent passage of light to the plate, and means to urge the collar into engagement with the plate.

12. In an automatic photographic mechanism, a supporting base, a receptacle for sensitized plates, a lens, means for engaging a plate to move it to position adjacent to said lens, a shutter for controlling passage of light to said lens, a member rotatable on said base, said member having a rotatable support thereon, said support having a plurality of cams thereon, any one of which may be shifted to operative position and means whereby one of said last mentioned cams controls said shutter, said cams being of different configurations whereby the time of exposure may be changed.

13. In an automatic photographic mechanism, a supporting base, a receptacle for sensitized plates, a reciprocating slide movable beneath said receptacle, a vertically arranged lens tube, a prism associated with said lens tube for directing horizontal light rays into said tube, means on said slide for engaging a plate to move it to position adjacent to said lens tube, a shutter for controlling passage of light to said lens tube, a member rotatable on said base, said member including a cam, means whereby said cam controls movement of said plate slide, said member having a second cam thereon, means whereby said last mentioned cam controls said shutter, a developing station including a receptacle, said receptacle having a movable side wall, means to move the plate to the developing station and means to deliver the plate from the developing station, said last mentioned means including the movable side wall of the receptacle.

14. In an automatic photographic mechanism, a supporting base, a receptacle for sensitized plates, a reciprocating slide movable beneath said receptacle, a vertically arranged lens tube, a prism associated with said lens tube for directing horizontal light rays into said tube, means on said slide for engaging a plate to move it to position adjacent to said lens tube, a shutter for controlling passage of light to said lens tube, a member rotatable on said base, said member including a cam, means whereby said cam controls movement of said slide, said member having a second cam thereon, means whereby said second cam controls said shutter, means to adjust the time of exposure, a developing station including a receptacle, means whereby the slide moves the plate to the developing station, means to deliver the plate from the developing station, said last mentioned means including one side wall of the receptacle, and means for operating the delivery means.

15. In an automatic photographic mechanism, a supporting base, a receptacle for sensitized plates, a reciprocating slide movable beneath said receptacle, a vertically arranged lens tube, a prism associated with said lens tube for directing horizontal light rays into said tube, means on said slide for engaging a plate to move it to position adjacent to said lens tube, resiliently operated means for engaging a plate positioned adjacent to said lens tube, a shutter for controlling passage of light to said lens tube, a member rotatable on said base, said member including a cam, means whereby said cam controls movement of said slide, said member having a rotatable support thereon, said support having a plurality of cams thereon, any one of which may be shifted to operative position, means whereby one of said last mentioned cams controls said shutter, said cams being of different configurations whereby the time of exposure may be changed, a developing station including a receptacle, means whereby the slide moves the plate to the developing station, a delivery chute, means to deliver the plate from the developing station to the delivery chute, said last mentioned means including one side wall of the receptacle, a third cam, said third cam being on the rotatable member and means operated by the third cam for controlling the delivery means.

16. In an automatic photograph machine, a receptacle for plates, a lens, means to advance a plate from said receptacle to a horizontal position adjacent to said lens, and means to expose said plate while in the horizontal position, a developing station and means to move said plate to a horizontal position at the developing station.

17. In a device of the class described, a receptacle for plates, a horizontal conveyor adjacent said receptacle, means to remove plates singly from said receptacle, a lens, said moving means acting to move said plates singly to said lens in a horizontal plane, a developing station and means to convey said plates horizontally from said lens to the developing station.

18. In an automatic photograph machine, a receptacle for plates, a lens, means to advance plates from said receptacle to a photographing station in front of said lens, a developing station, means to advance a plate from said lens to said developing station, means to supply developer to said plate, means to supply water to said plate, a delivery station, and means to advance a plate to the delivery station, said advancing means acting to convey said plate from station to station in a single plane.

19. An automatic photograph machine comprising a receptacle for sensitized plates, a horizontal slide adjacent said receptacle, means to remove plates singly from said receptacle, a lens tube, said tube being substantially vertically disposed, said slide acting to move said plates singly to said lens tube, and means to convey said plates from said lens tube to a developing station.

20. An automatic photograph machine comprising a receptacle for plates, a horizontal conveyor adjacent said receptacle, a lens tube, means to remove a plate from said receptacle and to move said plate in a horizontal plane to said lens tube, means to expose said plate, means to convey said plate from said lens tube horizontally to a developing station, means to develop said plate and means to deliver said plate from the machine.

21. In an automatic photographic mechanism, a supporting base, a receptacle for sensitized plates, a lens, means for engaging a plate to move it to position adjacent to said lens, a shutter for controlling passage of light to said lens, a discharge chute, means to deliver a plate from adjacent to said lens to said discharge chute and resiliently mounted means engaging the portion of the plate which is nearest the discharge chute to prevent entrance of light thereto from said discharge chute.

22. In an automatic photographic machine, a supporting base, a receptacle for sensitized plates, means to remove plates from said receptacle, said receptacle comprising a hollow body having a sliding cover thereon, said cover being arranged intermediate the ends of the body, a closure mounted on the end of said receptacle and adapted to close communication thereto, said cover in one position allowing plates resting thereon to pass into said receptacle.

23. In an automatic photograph machine, a receptacle for plates, a lens, means to advance a plate from said receptacle to a horizontal position adjacent to said lens, means to expose said plate while in a horizontal position, a developing station, means to move said plate to a horizontal position at the developing station, a tank for the developer, a tank for a washing fluid, means to conduct the fluid from each of said tanks to said developing station, means to control the passage of fluid through said conducting means, said last named means causing the developer to flow to said developing station and then to cause the washing fluid to flow to said developing station.

24. In a photograph machine, the combination with a lens and a bath, of reciprocating means for moving a plate from beneath the lens into the bath, a delivery chute, said bath having a movable side wall, and means including the movable side wall of the bath for moving a plate from the bath to the chute.

In testimony whereof, I hereunto affix my signature.

ROBERT E. OLSEN.